2,711,407

PRODUCTION OF SALTS OF CARBOXYALKYL CELLULOSE

Adrianus L. Bauling, Deventer, Netherlands, and David T. Milne, Fredericksburg, Va., assignors to American Viscose Corporation, Wilmington, Del., a corporation of Delaware No Drawing. Application April 17, 1951, Serial No. 221,514

9 Claims. (Cl. 260—232)

This invention relates to a process for producing purified salts of acidic colloidal materials and more particularly to the production of purified salts of acidic colloidal materials, which are substantially fibrous or are highly comminuted, without the use of organic solvents and without the formation of solutions, gels, doughy masses, pastes, etc. The process of the present invention is applicable to the production of purified salts of any acidic colloidal material, such as alginic acid, carboxyalkyl cellulose, carboxyalkyl hydroxyalkyl cellulose, etc. For purposes of simplicity of description, however, the invention will be described as it is applicable to the production of purified salts of carboxyalkyl cellulose, it being understood that this is done merely for purposes of illustration and the invention is not to be limited thereby but only insofar as the same may be limited in the appended claims.

It is known to produce salts of acidic colloidal materials, such as cellulosic materials, by washing the crude reaction mass with organic solvents or with aqueous organic solvents. For example, sodium carboxymethyl cellulose is produced by treating alkali cellulose with sodium chloroacetate and then washing the crude reaction mass with aqueous methyl or ethyl alcohol to remove impurities, such as sodium chloride, sodium glycolate, and the like. A product, purified in this manner and dried, can be milled to a finely divided fibrous condition. However, a method of this type is subject to a number of disadvantages. The method is slow and costly, particularly when the carboxyalkylation is carried out by the dough or kneader process in which the carboxyalkyl cellulose is formed as a compact, dense dough or gel which is not easily penetrated by the aqueous organic wash liquor. In addition, the recovery of the organic solvent employed necessarily increases the costs of operation. Further, purification is often incomplete so that the final product is contaminated with by-product salts.

It is also known to produce salts of acidic colloidal material, such as cellulose materials, by neutralizing the acid with alkalies such as hydroxides or carbonates of sodium, ammonium, potassium, barium, etc. These neutralizations may be carried out in the presence of sufficient water so that a solution of the resulting salt is formed or they may be carried out without adding water, in which case, as the neutralization proceeds, a doughy mass is formed. The products so produced can be dried only by such means as spreading a thin layer on the surface of a heated drum or by spray drying, etc. The primary disadvantage of such a procedure is that the products produced are not fibrous but are hard, horny, dark in color and difficult to dissolve.

It is an object of this invention to overcome the difficulties and disadvantages of prior art procedures and provide a method for producing salts of acidic colloidal material, such as cellulosic materials, which are substantially pure, fibrous and/or finely comminuted without resorting to the use of organic solvents and without the formation of pastes, gels, solutions, doughy masses, etc. which present drying difficulties and which result in products of inferior physical condition, quality, etc.

Another object is to provide a new and economical method for producing purified inorganic salts of acidic colloidal materials and particularly salts of carboxyalkyl celluloses.

Other objects and advantages of the present invention will be obvious from the description thereof hereinafter.

In general, the objects of the present invention are accomplished by forming an intimate mixture of the acidic colloidal material, in a wet condition, for example, carboxyalkyl cellulose, and a salt-forming agent under conditions such that little or no reaction takes place between them. The mixture is then comminuted before any substantial reaction has taken place and thereafter the reaction is caused to or allowed to proceed in the comminuted mass. In this way, a finely divided product is obtained which is substantially free of lumps and/or gelatinous material and which can be dried without making the product into a paste or solution, etc.

Heretofore, it has been found impractical to effect purification of carboxyalkyl celluloses having a substitution of over 0.6 carboxyalkyl groups per glucose unit on a commercial scale except by washing with organic solvents. By employing the process of the present invention, it is possible to eliminate purification by washing with organic solvents and prepare purified salts of carboxyalkyl celluloses having a substitution as high as 2.0 or more carboxyalkyl groups per glucose unit.

As a salt-forming or neutralizing agent there may be employed the hydroxides, carbonates, or bicarbonates of sodium, ammonium, lithium, barium, etc., organic bases, such as quaternary ammonium salts and the like. The conditions of admixture of the acidic colloidal material and the salt-forming or neutralizing agent, such as temperature, time, equipment, etc., may be altered to suit the particular product desired. The same is true for the conditions under which neutralization takes place. The mixing of the acidic colloidal material and the salt-forming agent and subsequent comminution of the mixture is preferably done quickly before substantially any reaction takes place. Of course, the time allotted to mixing and comminuting will vary depending upon the reactivity of the particular acidic colloidal material and the salt-forming agent being used. In addition, the amount of water in the acidic colloidal material is important. The temperature employed for mixing and comminuting is preferably below that at which the salt-forming agent is readily soluble in water, especially for hydroxides which usually are very reactive. That is to say, the more water present the lower the temperature or time, the latter being dependent primarily upon the ease with which the particular acidic colloidal material and salt-forming agent can be mixed and satisfactorily comminuted. These adjustments in time, temperature, etc. can be readily made by one skilled in the art.

When comminuting the mixture of the acidic colloidal material and the salt-forming agent, various devices may be employed, such as a hammer mill of the impact type, rotary cutter, rotary picker, etc., devices with moving blades or vanes, such as, or similar to conventional fans for blowing air or gases, etc. Alternatively, the mixing of the acidic colloidal material and the salt-forming or neutralizing agent may be performed simultaneously with the comminution, depending, of course, on the equipment available.

In the case of a carboxyalkyl cellulose derivative or salt, for example, the process comprises the following steps: alkali cellulose, which has been prepared in conventional manner, is reacted with a salt of a halogenoaliphatic acid with thorough mixing, such as in a device of the Werner-Pfleiderer type. The resultant reaction mass, comprising a salt of carboxyalkyl cellulose plus various impurities, is added to an excess of an aqueous solution of a strong mineral acid, such as sulfuric acid, and the like. The carboxyalkyl cellulose, being insoluble, is filtered off and washed free of impurities with water. The excess liquor is then removed by centrifuging or by a suction filter, etc. and/or by pressing, squeezing between rolls, etc. The carboxyalkyl cellulose, which contains approximately 50 to 90% water, based on the weight of the damp mass, is then intimately mixed with a neutralizing or salt-forming agent, such as hereinbefore named, under conditions such that substantially no reaction takes place, for example, at 20° C. for 5 minutes in a mixer or shredder of the Werner-Pfleiderer type, or any other conventional design. After thorough mixing, examination of the product shows it is still substantially insoluble in water.

The mixture of carboxyalkyl cellulose and salt-forming agent is then comminuted in any one of the devices hereinbefore named. This is an important step in the process. The product is comminuted to a fibrous and/or finely divided state before any substantial reaction takes place forming the water-soluble salt. By this process, purification is effected without a step which may form an undesirable solution, paste, gel, etc. resulting in the necessity of drying, as a result of which a hard, horny, and difficultly soluble solid would be produced.

In order to effect reaction between the carboxyalkyl cellulose and the salt-forming or neutralizing agent, several procedures may be followed: (1) the comminuted mass may be stored for several hours at ordinary temperatures, for example, for 8 to 24 hours at 20° to 30° C.; (2) the comminuted mass may be heated to 40° to 60° C. for 1 to 3 hours; (3) the comminuted mass may be dried at 60° to 120° C. in a rotary or tunnel drier, or in an oven, etc. The time of reaction varies generally inversely with the temperature. In all three cases, a water-soluble product results which is fibrous and/or finely divided and substantially free of gelatinous material, and the like.

If desired, the purified and water-soluble salt of the carboxyalkyl cellulose may be further comminuted, dried if necessary, and again comminuted, or it may be processed by omission of any or all of these steps depending upon the nature of the product and/or its intended end use.

The following examples are given to illustrate specific embodiments of the invention.

Example I

A sodium carboxymethyl cellulose reaction mass, produced by reacting alkali cellulose with sodium chloroacetate in a Werner-Pfleiderer mixer and containing impurities, such as sodium hydroxide, sodium chloride, sodium glycolate, etc., was added to an excess of an aqueous 15% sulfuric acid solution and thoroughly stirred. The carboxymethyl cellulose was filtered off and washed with warm water until free of salts. The salt-free carboxymethyl cellulose was then centrifuged until it contained approximately 60% water. The carboxymethyl cellulose had a degree of substitution of 0.9 carboxymethyl groups per glucose unit. The carboxymethyl cellulose was then mixed in a Werner-Pfleiderer mixer for 5 minutes at 20° C. with sufficient sodium carbonate to neutralize it. The resultant mixture was then comminuted in a hammer mill while maintaining the temperature at 20° C. The comminuted mass was then stored in cans at 25° C. for a period of 16 hours to allow the neutralization to take place. The resultant product was a substantially pure water-soluble sodium carboxymethyl cellulose in a fibrous condition substantially free of gelatinous material, and the like, which could be dried without formation of lumpy, crusty, horny, or discolored material.

Example II

Following the same procedure in Example I, a sodium carboxyethyl cellulose reaction mass was added to an excess of 15% $H_2SO_4$ solution. The salt free carboxyethyl cellulose was centrifuged until it contained approximately 70° water. The carboxyethyl cellulose was mixed with sodium carbonate at 20° C. for 5 minutes as in Example I and then comminuted in a hammer mill. The comminuted unreacted mass was then heated to 50° C. for 2 hours to effect neutralization. The resultant product was a pure water-soluble sodium carboxyethyl cellulose in a fibrous form which could be dried without becoming hard or discolored.

Example III

The procedure of Example I was followed using hydroxyethyl cellulose as a starting material and reacting the same with sodium chloroacetate in the presence of caustic soda to form the sodium carboxymethyl hydroxyethyl cellulose. The acidic cellulose derivative was centrifuged to 80% water content and then mixed with potassium carbonate, as in Example I, and comminuted in a hammer mill. The comminuted unreacted mass was then dried at 80° C. in an oven wherein neutralization took place. The resultant pure water-soluble potassium carboxymethyl hydroxyethyl cellulose was in a fibrous form.

Example IV

A salt-free carboxymethyl cellulose, containing approximately 60% water, was prepared as described in Example I. The carboxymethyl cellulose was mixed in a Werner-Pfleiderer mixer for 5 minutes at —10° C. with sufficient sodium hydroxide to neutralize it. At this temperature the sodium hydroxide will not dissolve in the water present. The mixture was comminuted in a hammer mill while maintaining the temperature at —10° C. Thereafter, the comminuted mass was stored under conditions such that the temperature thereof was allowed to rise slowly causing neutralization to take place. For example, the mass was allowed to stand for 16 hours while allowing the temperature to rise to 25° C. The water-soluble sodium carboxymethyl cellulose so produced was equal in quality to that produced in Example I.

Either sodium hydroxide and potassium hydroxide or both may be mixed with the wet carboxyalkyl cellulose and the resultant mixture comminuted without reaction taking place by maintaining the temperature in a range of —5° C. to —20° C. or lower. In this range neither of the above-mentioned salt-forming agents is soluble in water.

There are numerous advantages of the present process among a few of which are the possibility of producing finely divided or fibrous salts of acidic colloidal materials in substantially pure form, which are of desirable appearance, solubility, etc. without the use of organic solvents, i. e., without involving the expense of the solvents, their handling, recovery, etc. Further, the present process permits the production of various pure salts of acidic colloidal materials without the undesirable formation of pastes, gels, or solutions which are expensive and difficult to dry, and in addition, yield products, the appearance and other properties of which are inferior. The present process also permits manufacture of a wide variety of salts which is not possible when the reaction mass is washed with organic solvents. Further, it is possible to produce mixed salts of acidic colloidal materials by means of the present invention, such as sodium-potassium carboxymethyl cellulose, etc.

It is to be understood that the above description is merely illustrative and that various changes may be made without departing from the spirit and scope of the invention as defined in the appended claims.

We claim:

1. A process for producing salts of a carboxyalkyl cellulose having a substitution of 0.6 to 2.0 carboxyalkyl groups per glucose unit comprising mixing the carboxyalkyl cellulose, containing 50 to 90% water based on the weight of the wet mass, with an alkaline neutralizing agent at 20° C. for a period of the order of 5 minutes, the amount of said agent being approximately that required for reacting with the carboxyl groups of said cellulose, comminuting the mixture before substantially any neutralization takes place and then subjecting the comminuted mixture to conditions of temperature and time which cause neutralization to take place to obtain a finely divided product.

2. A process as defined in claim 1 wherein the comminuted mixture is subjected to a temperature in the range of 20 to 120° C. for a period of 1 to 24 hours, the time varying generally inversely as the temperature, to effect neutralization.

3. A process as defined in claim 2 wherein the comminuted mixture is stored for 8 to 24 hours at 20 to 30° C. to allow neutralization to take place.

4. A process as defined in claim 2 wherein the comminuted mixture is heated to 40 to 60° for 1 to 3 hours to effect neutralization.

5. A process for producing water-soluble salts of carboxyalkyl cellulose having a substitution of 0.6 to 2.0 carboxyalkyl groups per glucose unit comprising reacting alkali cellulose with sodium chloroacetate, mixing the reaction mass with an excess of an aqueous solution of a strong mineral acid, filtering off the carboxyalkyl cellulose and washing with water until free of impurities, centrifuging the carboxyalkyl cellulose until it contains 90 to 50% water, mixing with a neutralizing agent at 20° C., the amount of said agent being approximately that required for reacting with the carboxyl groups of said cellulose, comminuting the mixture and then allowing neutralization to take place in the comminuted mixture to form the water-soluble carboxyalkyl cellulose salt to obtain a finely divided product.

6. A process as defined in claim 5 wherein the neutralizing agent is selected from the group consisting of inorganic hydroxides, carbonates, bicarbonates, and quaternary ammonium salts.

7. A process for producing water-soluble salts of carboxymethyl cellulose having a substitution of 0.6 to 2.0 carboxymethyl groups per glucose unit comprising reacting alkali cellulose with sodium chloroacetate, mixing the reaction mass with an excess of an aqueous solution of sulfuric acid, filtering off the carboxymethyl cellulose and washing it with water until free of impurities, centrifuging the carboxymethyl cellulose until it contains 60% water, the amount of sodium carbonate being approximately that required for reacting with the carboxyl groups of said cellulose, mixing the carboxymethyl cellulose with sodium carbonate at 20° C., comminuting the mixture and then allowing the comminuted mixture to stand for 16 hours at 25° C. to form a water-soluble sodium carboxymethyl cellulose in a finely-divided condition.

8. A process for producing water-soluble salts of carboxymethyl cellulose having a substitution of 0.6 to 2.0 carboxymethyl groups per glucose unit comprising reacting alkali cellulose with sodium chloroacetate, mixing the reaction mass with an excess of an aqueous solution of sulfuric acid, filtering off the carboxymethyl cellulose and washing it with water until free of impurities, mixing the carboxymethyl cellulose with sodium hydroxide at a temperature lower than —5° C., comminuting the mixture at a temperature lower than —5° C., and then allowing the mixture to stand at a temperature of about 25° C. for about 16 hours to form a sodium carboxymethyl cellulose in a finely divided condition.

9. A process for producing salts of a carboxyalkyl cellulose having a substitution of 0.6 to 2.0 carboxyalkyl groups per glucose unit comprising mixing the carboxyalkyl cellulose containing 50 to 90% water based on the weight of the wet mass with alkaline neutralizing agent at 20° C. for a period on the order of 5 minutes, the amount of said agent being approximately that required for reacting with the carboxyl groups of said cellulose, comminuting the mixture substantially before any neutralizing takes place, then heating the comminuted mixture at a temperature of 60 to 120° C. until dry with neutralization taking place during said heating and resulting in a finely divided product.

References Cited in the file of this patent

UNITED STATES PATENTS

| | | |
|---|---|---|
| 2,513,807 | Lamborn | July 4, 1950 |

FOREIGN PATENTS

| | | |
|---|---|---|
| 572,868 | Great Britain | Oct. 26, 1945 |